United States Patent [19]
Scott et al.

[11] 3,787,268
[45] Jan. 22, 1974

[54] HANK FORMING MACHINE FOR A POLE CONSTRUCTION AND A METHOD OF FORMING A POLE

[75] Inventors: Arthur Leslie Scott, Columbia; J. Hilton Parsons, Jr.; John S. Hammond, Newberry, all of S.C.

[73] Assignee: Shakespeare Company, Columbia, S.C.

[22] Filed: Nov. 22, 1971

[21] Appl. No.: 200,874

[52] U.S. Cl. .................. 156/425, 28/21, 156/166, 156/180, 156/187, 156/195, 156/433, 156/441, 156/459
[51] Int. Cl. ........................................... B65h 54/56
[58] Field of Search ... 156/166, 180, 187, 195, 296, 156/425, 431, 432, 433, 441, 459; 57/25, 26; 242/53; 28/21

[56] References Cited
UNITED STATES PATENTS

| | | | |
|---|---|---|---|
| 2,719,351 | 10/1955 | Drummond | 28/21 |
| 2,602,766 | 7/1952 | Francis | 156/180 |
| 2,786,793 | 3/1957 | Shobert | 156/296 |
| 3,183,143 | 5/1965 | Harris | 156/296 |
| 2,694,661 | 11/1954 | Meyer | 156/441 |
| 2,571,717 | 10/1951 | Howald et al. | 156/441 |
| 3,578,529 | 5/1971 | Baker | 156/433 |

Primary Examiner—Daniel J. Fritsch
Attorney, Agent, or Firm—Francis T. Carr et al.

[57] ABSTRACT

The roving is fed between the spokes of the rotatable member of the hank forming machine to form a plurality of drapes of variable lengths. The drapes are thereafter lifted and pressed against the mandrel for subsequent movement through the deformable orifice. After wrapping with cellophane, the assembly is cured so as to form a self-supporting pole. The length of the drapes between the spokes can be varied so as to form a tapered pole or a pole of variable thickness.

25 Claims, 10 Drawing Figures

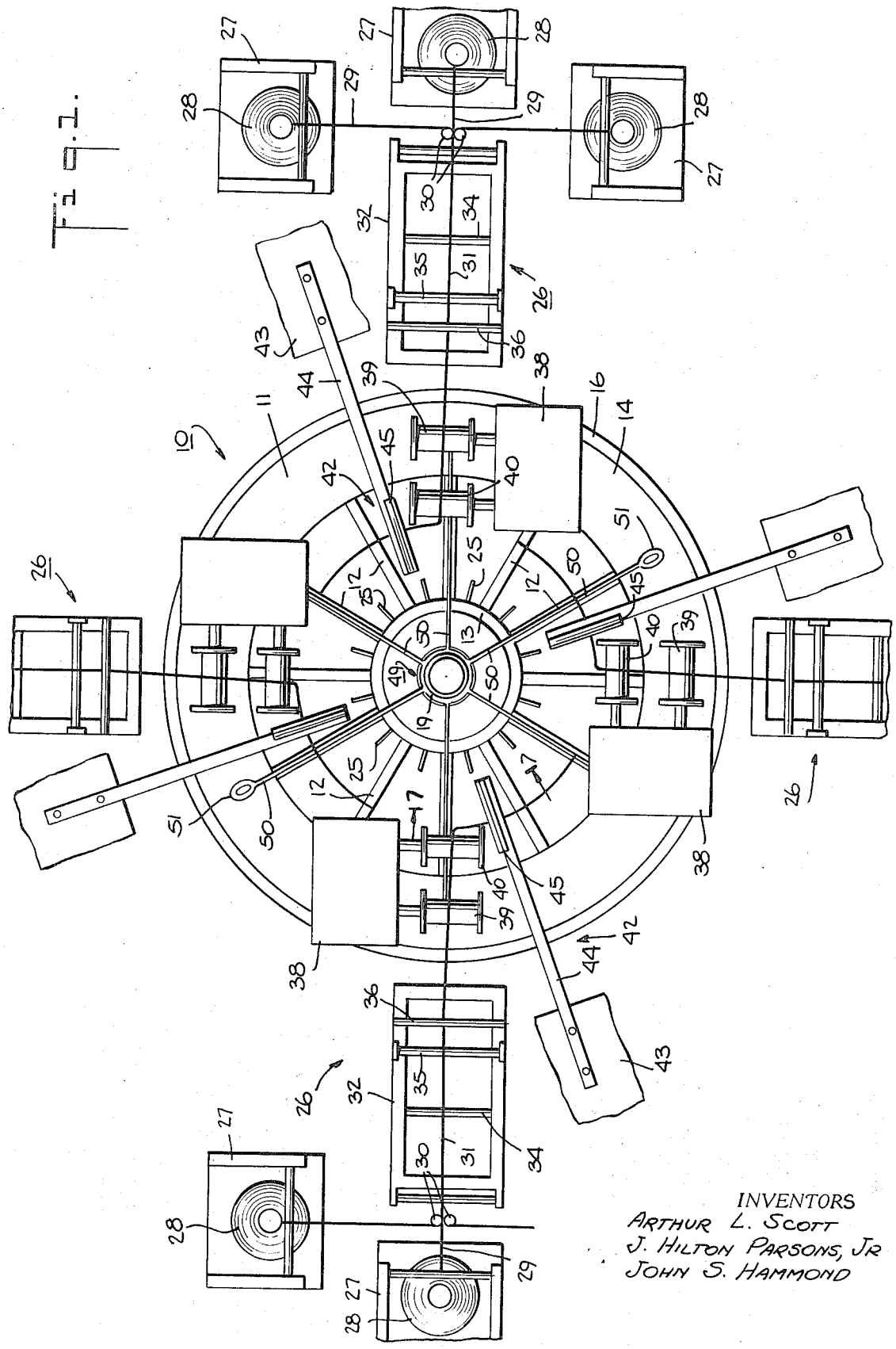

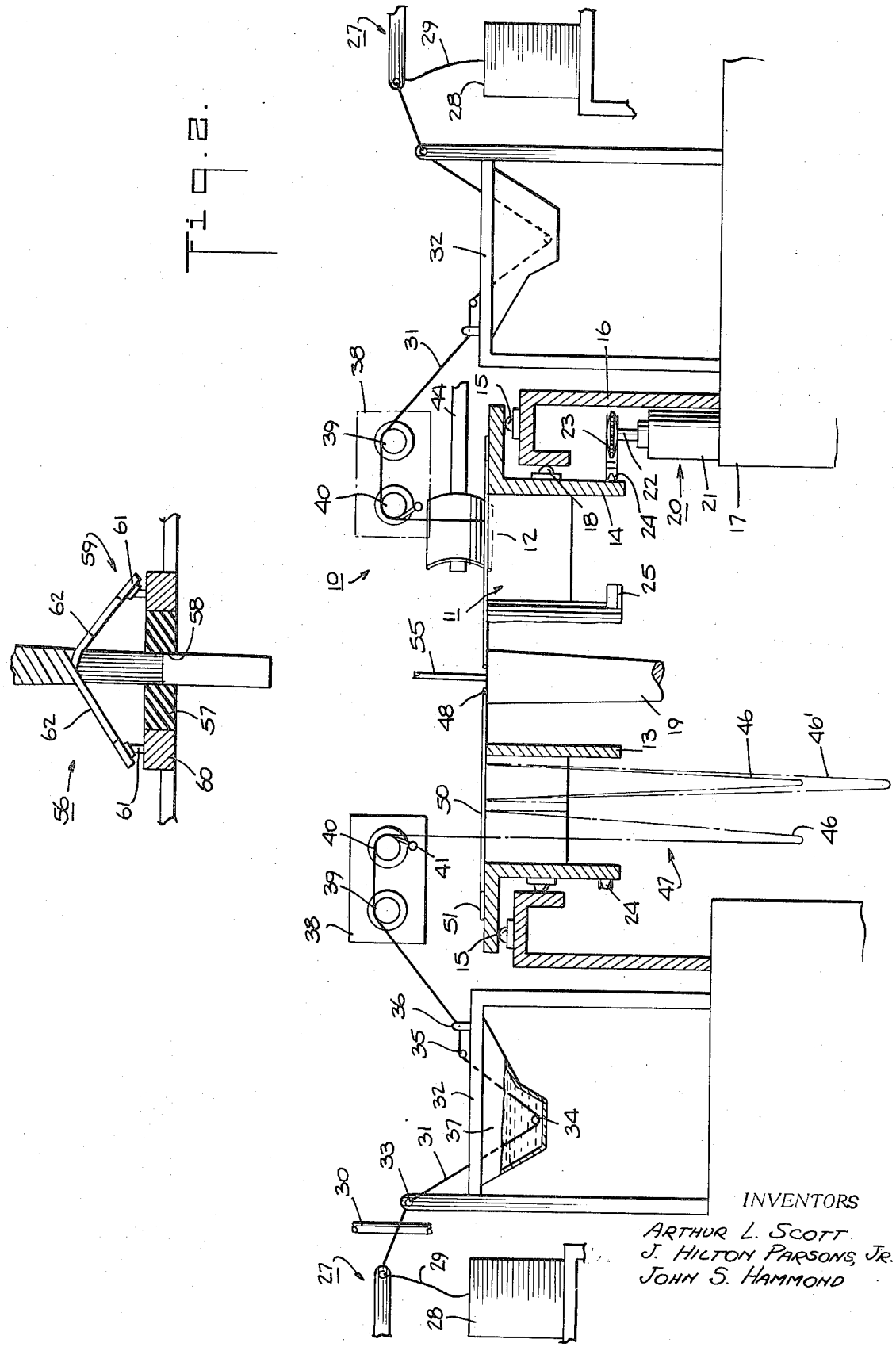

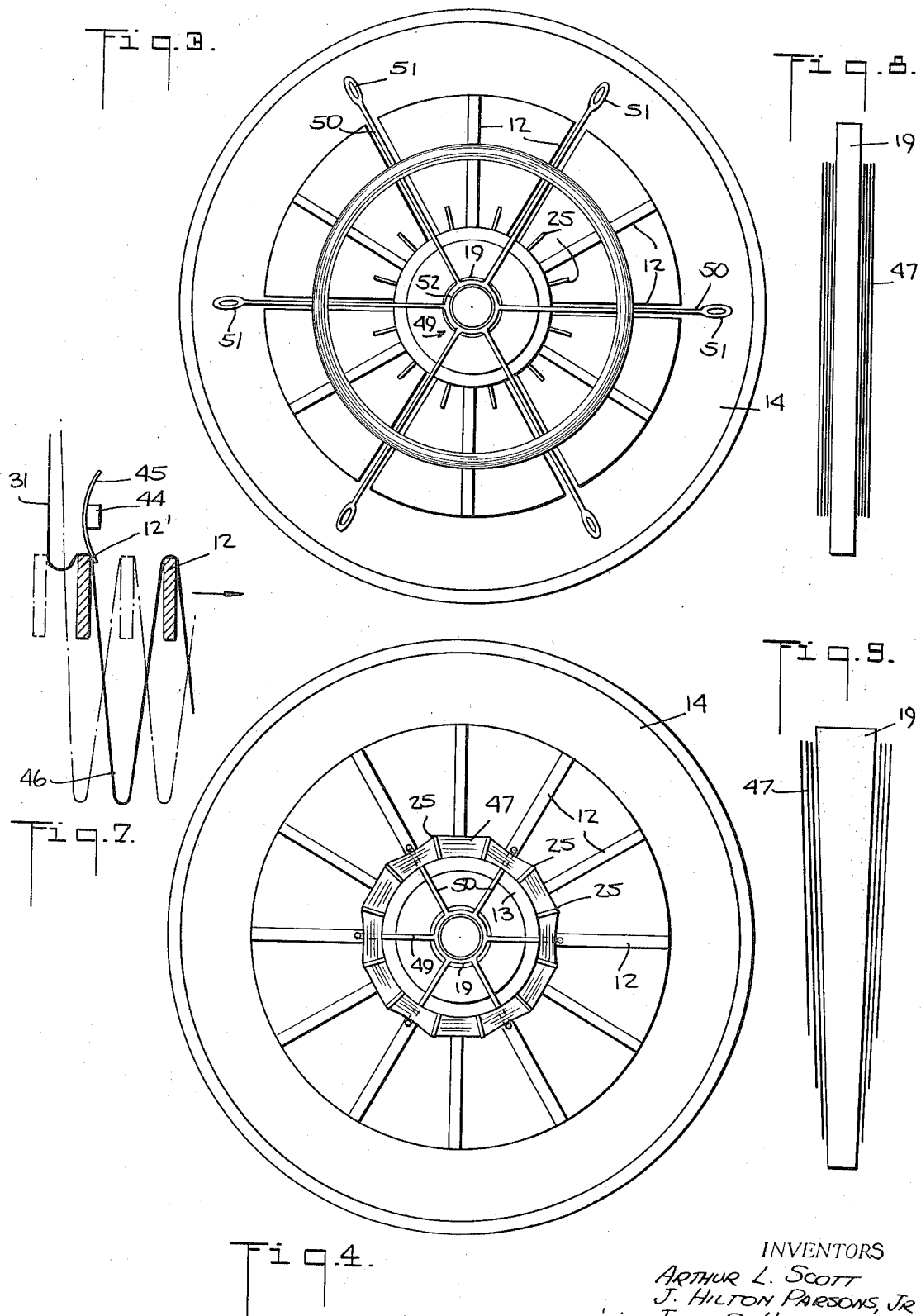

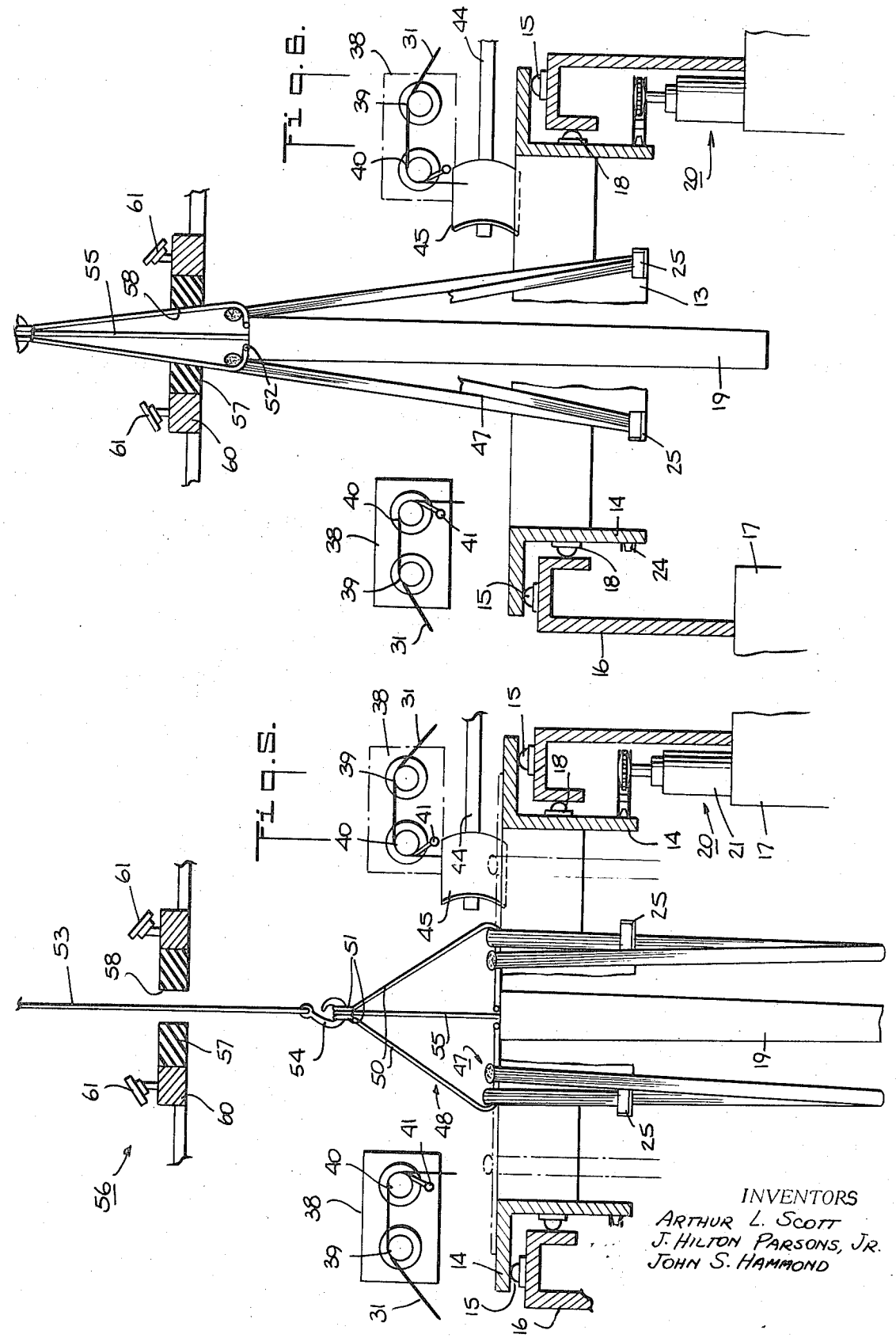

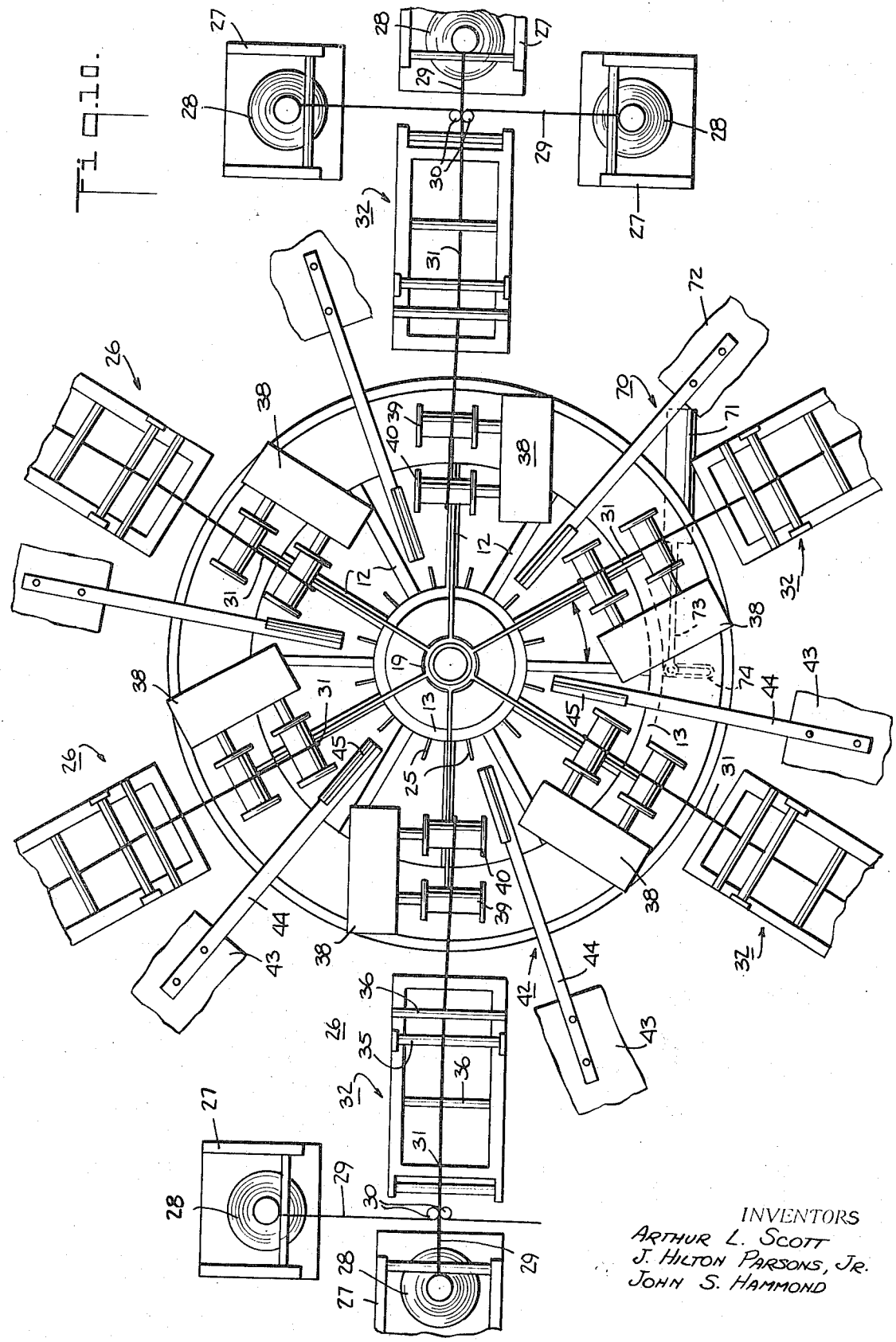

HANK FORMING MACHINE FOR A POLE CONSTRUCTION AND A METHOD OF FORMING A POLE

This invention relates to a hank forming machine for the construction of poles and to a method of forming a pole. More particularly, this invention relates to a machine for constructing poles of filamentary material and a method of forming the same.

Heretofore, various techniques have been known for constructing rods of synthetic materials such as glass fiber. In several instances, the synthetic rods have been constructed in a continuous manner by directing filamentary material in a horizontal plane or by feeding filamentary material downwardly over a suitable mandrel into a mold. However, these techniques have been difficult to employ for the manufacture of tapered poles or rods since the filamentary material cannot be readily oriented for creating the different thicknesses required by a tapered pole or rod. In order to overcome this disadvantage, it has been known to employ equipment such as described in U.S. Pat. No. 2,918,104, for constructing tapered rods. Generally, this equipment utilizes a mandrel over which a layer of resin impregnated fiber strands are disposed longitudinally with a portion of the strands running the complete length of the mandrel while others start at the one end and run only part way towards the other end of the mandrel in varying degrees. In this way, the final wall thickness built up by the longitudinal fibers will be thicker at the one end and thinner at the opposite end so as to produce the taper in the finished rod. However, when it becomes necessary to manufacture tapered tubes or poles in larger sizes, such as, for street lighting poles, flag poles, power transmission poles and the like, the previously known machines such as that described in the above patent require a relatively large inventory of fiber strands as well as a large number of cutoff means for severing the various fiber strands to achieve the taper in the finished pole. Further, such machines would be of a relatively large unwieldly size and would require the handling of heavy mandrels in a difficult horizontal position.

Accordingly, it is an object of this invention to provide a simple means for manufacturing tapered poles of relatively long length.

It is another object of the invention to reduce the inventory of filamentary material required for constructing tapered poles or rods.

It is another object of the invention to avoid the need to precisely locate circumferentially and sever filamentary material in the production of a tapered rod or pole.

It is another object of this invention to provide an apparatus for forming tapered rods which is of relatively compact size.

It is another object of this invention to provide an apparatus which is adapted to forming tapered rods of various sizes.

It is another object of this invention to provide a method of forming tapered rods in a simple efficient manner with a minimum of manual effort.

Briefly, the invention provides an apparatus and method for forming a tapered pole or rod like structure which utilizes a draped hank of resin impregnated filamentary material.

The apparatus includes a hank forming machine on which a draped hank is formed and a hank lifting means for removing the hank from the forming machine. This apparatus cooperates with a tape wrapping assembly and, in at least one embodiment, a mandrel and associated mandrel lifting means so that the hank, and mandrel, can be formed into a suitable package for hardening, or curing purposes.

The hank forming machine includes a rotatable member such as a wheel having a plurality of spokes which radiate from a central portion, a feed means for feeding a continuous length of resin impregnated roving or filamentary material into the spoked member and a means for moving the spoked member relative to the feed means so as to direct the fed length of roving or filamentary material to drape over at least one of the spokes.

In one embodiment, the rotatable menber includes a plurality of spokes which are disposed in a circumferential pattern about a center ring and a number of feed means are provided for feeding a plurality of rovings into the member. In addition, the means for moving the spoked member is constructed to rotate the spoked member so that during operation the roving is fed between consecutive pairs of spokes as the member rotates while being draped over the intermediate spokes. Thus, a series of depending drapes are formed on the spokes of the member. Also, the means for moving the spoked member is constructed to impart a variable speed to the spoked member so that as the speed of the member increases, the lengths of succeeding drapes between consecutive pairs of spokes decreases. As a result, when the feeding operation has been completed, the hank which remains on the spoked wheel in draped fashion includes drapes of different lengths. Thus, the upper end of the hank which lays over the spokes has the greatest number of filaments or roving material while the lowermost portion of the hank has the fewest lengths of filamentary material.

This embodiment may also be operated so that the means for moving the spoked rotatable member rotates the member in an intermittent fashion. That is, with the member in a stationary position, the feed means directs a roving between a pair of consecutive spokes. After a certain time, during which a predetermined length of drape is formed, the member is rotated at a relatively fast rate so as to cause the fed material to enter into the space between the next consecutive pair of spokes.

In another embodiment, the rotatable member can be actuated by the moving means so as to oscillate in a back and forth movement. In this embodiment, the feed means feeds a length of roving to one side of a spoke and after a predetermined time, the member is moved to present the space on the opposite side of the spoke to the fed roving. After a period of time, the member is reversed so that the roving is again fed to the first side of the spoke. In this way, after a number of reversals, a drape would form on each side of the spoke. The two sets of drapes would then be lifted by the lifting means associated therewith in combination with one or more similar sets of drapes on other spokes. The drive mechanism for this embodiment is simplified in that a reciprocating air cylinder can be used to drive the member in an oscillating manner instead of using, e.g., a motor, and such related equipment as a speed reducer, pinion and bull gear drive, for rotary motion.

The hank lifting means for removing the draped hank maintains the drapes while transporting the same through the tape wrapping assembly. For example, the lifting means utilizes a cable bridle formed of a length of cable with a spliced loop at each end which can be threaded under the drapes of material on the spokes. In addition, the lifting means includes a hoist of suitable construction having a hoist hook to which the bridle and looped bridle ends can be secured and raised. In this way, th entire hank of filamentary material is raised.

Alternatively, the cable bridle can have a number of cable members arranged radially so as to resemble an asterisk. Each cable member has a spliced loop at the outer end and each of the inner ends is attached to a common point. Each cable can be used to lift one drape or can be used to lift a pair of drapes. In this latter regard, the bridle would be arranged with one radiating cable about every other spoke of the member and, after the hank is completed, the operator would thread each cable loop end through the alternate drape so that each cable would pick up two drapes.

The tape wrapping assembly which can be of known construction includes an orifice which is sized and shaped to compact the impregnated material circumferentially as the material is passed therethrough by the lifting means. The assembly also has a wrapping head which serves to wrap at least one wrapper about the compacted material so as to form a package suitable for curing.

The apparatus of the invention cooperates with a suitable means for curing or otherwise hardening of the resin within the package so that a self-supporting rod or pole like structure is formed in the usual manner.

The hank forming machine is used, in most cases, with a mandrel which is sized to move through the center ring of the rotatable member in an upward vertical direction. This mandrel is lifted by a suitable lifting means simultaneously with the lifting of the hank formed on the spokes of the rotatable member and is moved simultaneously through the orifice of the tape wrapping head. In this way, the hank which is formed in a substantially circular pattern about the mandrel is collapsed about and pressed circumferentially against the mandrel. Upon passing through the wrapping assembly, the wrapping firmly secures the filamentary material of the hank in place on the mandrel. After curing, the mandrel can be removed so as to provide for a hollow pole or can be retained in place. The mandrel may be of hollow or solid construction of any suitable material and can, additionally, be covered with a helical winding of filamentary material. The mandrel can also be of tapered construction. Furthermore, depending upon the degree of taper and the wall thickness of the finished structure, the mandrel can be sized relative to the hank of material so as to obtain a constant wall thickness or a variable wall thickness.

The apparatus of the invention also includes a severing means for severing the lower ends of the drapes formed on the hank forming machine so as to leave ends in the filamentary material. This severing means is constructed for example, of knife blades, each of which projects from the center ring of the rotatable member between a pair of separated spokes so as to sever the drapes as the drapes are lifted from the rotatable member. In this respect, it is noted that the drapes are first moved along the respective spokes towards the center of the rotatable member so as to come within the projected plane of the knife blades before being lifted.

The apparatus also includes means, such as a resilient flapper, which is positioned to hold the filamentary material on a spoke to one side as the drape is being formed on the opposite side of the spoke. This allows the filamentary material to form a new drape in the space between the next consecutive pair of spokes without slipping back into the drape in the preceeding space. In the case of a flapper, the flapper is mounted over the rotatable member to project into the plane of the spokes and is sufficiently resilient to permit passage of the spokes thereby. To this end, the flapper can be made of a resilient spring shim stock material. The flapper is further positioned in spaced relation to an adjacent feed device to engage the filamentary material against a spoke after the member has moved a sufficient distance to initiate the forming of a drape in the next consecutive space.

The filamentary material which is used to form the pole can be of any suitable nature. For example, the filamentary material can be formed of graphite, glass fiber or boron filaments or a combination of each. Also, the filamentary material can be made of organic yarns, such as nylon and polyester and the like. Similarly, any suitable resin material can be used to impregnate the filaments and form the package into a hardened self-supporting structure.

The method of the invention comprises the steps of forming a continuously fed roving of resin impregnated filamentary material into a hank of a plurality of depending drapes with looped filaments of variable lengths, of thereafter moving the resultant hank through an orifice in order to press the filamentary material together, and of subsequently wrapping the pressed material together for subsequent hardening of the resin and filamentary material into a self-supporting structure. As the filaments of the drapes are formed of variable length, when the hank is bunched together the upper end of the hank has a greater cross-sectional area of filamentary material than the lowermost portion.

In one embodiment, the method further includes the steps of forming the drapes in a circular pattern and of bunching the draped roving together about a mandrel positioned within the circular pattern of the hank. The hank is then compacted circumferentially about the mandrel prior to wrapping. Thereafter, the package formed by the resin impregnated roving and mandrel is cured in any suitable fashion to form a self-supporting pole. The wrapping can then be stripped and the mandrel can be removed or retained in place.

The pole or rod structure which is formed by the invention can be of any suitable length and can be hollow or solid. The apparatus for carrying out the invention is of simplified construction since it is only necessary to drape the roving on the spokes in a pattern to achieve the desired taper in the resultant pole. There is no need to incorporate any special cutting mechanisms for varying the length of the indivudual filaments of the roving since the variable drapes accomplish this purpose.

In addition, the mandrel and draped hank can be lifted simultaneously by a single mechanism such as any large hoist through the wrapping head assembly so that a package of suitable length can be formed in a relatively compact space. This type of operation also facilitates handling of relatively long mandrels, should such be used.

Further, since the hank can be formed of a single continuous roving or a plurality of continuous rovings, there is no need to provide for a large inventory of different lengths of filamentary materials. Also, since there is no cutting off of filamentary material within the hank forming apparatus, there is no waste involved in the manufacture of the pole.

These and other objects and advantages of the invention will become more apparent from the following detailed description and appended claims taken in conjunction with the accompanying drawings in which:

FIG. 1 illustrates a plan view of a hank forming machine according to the invention;

FIG. 2 illustrates a sectional view of the apparatus of FIG. 1;

FIG. 3 illustrates a plan view of a spoked rotatable member with a bridle and a hank disposed thereon according to the invention;

FIG. 4 illustrates a view similar to FIG. 3 of the bridle looped about the hank immediately prior to lifting;

FIG. 5 illustrates a view of the lifting means with respect to the hank and mandrel;

FIG. 6 illustrates a view similar to FIG. 5 with the mandrel and hank being passed through the orifice of the wrapping assembly;

FIG. 7 illustrates a side-view of a flapper according to the invention in conjunction with a spoke of the rotatable member;

FIG. 8 illustrates a mandrel having a uniform diameter in conjunction with the hank according to the invention;

FIG. 9 illustrates a view of a tapered mandrel in conjunction with a hank according to the invention; and FIG. 10 illustrates an embodiment of the hank forming apparatus for oscillation by means of a reciprocating piston according to the invention.

Referring to FIGS. 1 and 2, the hank forming machine 10 includes a rotatable member 11 in the form of a wheel having a plurality of radially directed spokes or ribs 12 secured between an inner center ring 13 and an outer flanged ring 14.

As shown in FIG. 2, the member 11 is supported via the outer ring 14 on suitable bearings 15 mounted on an upstanding support 16 over a pit 17. In addition, the periphery of the outer ring 14 is provided with suitable guide bearings 18 so as to guide the member 11 during rotation within the support member 16. The center ring 13 is sized with an opening to permit passage of a tapered mandrel 19 therethrough in a vertical direction from within the pit 17. As shown, the larger end of the mandrel 19 is at the upper end.

In order to rotate the member 11, a drive means 20 is mounted within the support 16 adjacent to the pit 17 entrance and is connected to the outer ring 14. This drive means 20 includes a variable speed motor 21 within the support 16 having a suitable speed reducer and pinion 22, a drive chain 23 and a plurality of teeth 24 on the outer ring 14 in meshing engagement with the chain 23. The variable speed motor 21 is programmed so as to vary the speed of the rotatable member 11, for example, by a graph actuated control (not shown).

The rotatable member 11 is also provided with a severing means such as a plurality of knife blades 25, each having a sharpened lower edge and each of which is positioned between a pair of spokes 12 to radiate from the center ring 13 for a purpose as described below.

Referring to FIG. 1, the hank forming machine 10 also includes a plurality of feed means 26 for directing a roving of filamentary material into the rotatable member 11 between the spokes 12. Each feed means 26 is in the form of a capstan type roving feed device which includes a plurality of, for example, three, supply stations 27 in which roving packages 28 of filamentary material are placed for supplying a continuous roving 29 to the hank forming machine 10. In addition, each feed device 26 cooperates with a pair of guide rolls 30 to direct the separate rovings 29 into a single roving 31 for delivery to the rotatable member 11 as well as with a resin tank 32 into which the combined roving 31 is directed through suitable guide means 33-36 so as to be immersed in a resin bath 37 contained within the tank 32. Alternatively, the rovings 29 can be fed separately to the member 11. Each feed device 26 includes a capstan drive 38 which is driven at a constant speed and includes a pair of rollers 39, 40 over which the impregnated roving 31 can be pulled and directed into the rotatable member 11. The last capstan roll 40 has a ground chrome plated surface thereon and cooperates with a spring steel wiper blade 41 which shaves the resin impregnated roving 31 from the roll 40 causing the roving 31 to drop through one of the spaces between a pair of spokes 12 of the rotatable member 11. The wiper blade 41 prevents the tacky and sticky roving 31 from sticking to the roll 40 as the roll 40 rotates and ensures release of the roving from the roll 40.

Referring to FIGS. 1 and 2, the machine 10 also includes a flapper assembly 42 adjacent each feed means 26 for purposes of holding a roving 31 against a respective spoke 12 of the rotatable member 11 as a drape is being formed in an adjacent space. Each flapper assembly 42 includes a support 43, an arm 44 which projects from the support 43 over the rotatable member 11 and a resilient flapper plate 45, for example, of resilient spring steel. The flapper plate 45 is disposed to pass into the plane of the spokes 12 of the rotatable member 11 and is of sufficient resiliency to permit passage of the spokes 12 thereby. The flapper plate 45 of each flapper assembly 42 is spaced from the adjacent feed means 26 a distance sufficient to permit the feed means 26 to feed a roving 31 into a space between two adjacent spokes 12. For example, each flapper plate 45 is positioned at one half a spoke spacing from the feeding position of a feed means 26. Upon movement of the rotatable member 11 so as to position a second space below the feed means 26, the flapper plate 45 abuts against the spoke 12' to hold the fed roving 31 in clamped fashion (cf. FIG. 7) between the spoke 12 and the flapper plate 45. In this way, the roving 31 is securely held in place without slipping while a fresh drape is formed in the next adjacent space.

In operation, each feed means 26 supplies a continuous length of resin impregnated roving 31 from the respective roving packages 28 and respective resin tanks 32 over the capstan drives 38 into a space formed between two spokes 12 of the rotatable member 11. As the rovings 31 are continuously fed into the space, the rotatable member 11 is continuously driven by the motor 21. After a predetermined length of time, the respective spokes 12 of the rotatable member 11 will pass by the capstan drives 38 so that the rovings 31 will then move over the spokes 12. At this time also, the flapper plates 45 each engage a roving 31 against a spoke 12 so as to prevent further movement of the roving 31 relative to the spoke 12. Thereafter, as each feed means 26 continues to feed a roving 31, the roving 31 falls into the next space. Continued operation of the feed means 26 and rotatable member 11 thus causes the roving 31 to form a drape 46 within the space between the two adjacent spokes 12. The net result is that a hank 47 consisting of a plurality of drapes 46 is formed over the spokes 12 of the rotatable member 11 in a circular pattern. As the speed of the rotatable member 11 is varied by the motor 21, continued rotation of the member 11 allows additional drapes 46' to form over the spokes 12 of a different depending lengths than the previously formed drapes 46. For example, where the rotational member 11 is increased in speed at a predetermined time interval, a shorter drape is formed between the spokes 12. Should the speed decrease so that a longer time remains for the roving to be fed into the various spaces, a longer drape is formed.

It is to be noted that the rotatable member 11 can be moved in an intermittent manner by the drive means 20. In this case, the feed means 26 feeds the roving 31 between the spokes 12 while the rotatable member 11 is stationary. After a predetermined length of time, the rotatable member 11 is actuated by the motor 21 so as to rapidly move a distance sufficient to permit each feed means 26 to feed into the next consecutive space of the member 11. At the same time, the flapper plates 45 would engage the rovings 31 against the spokes 12 so as to prevent slippage of the rovings 31 with respect to the spokes 12.

Referring to FIGS. 1 and 2, in order to remove the formed hank 47 from the hank forming machine 10, a lifting means 48 is provided on the rotatable member 11 for subsequent lifting of the formed tank 47. The lifting means 48 includes a cable bridle 49 having a number of cable members 50 arranged radially, e.g., in the form of an asterisk. As shown, the number of cable members 50 corresponds to one-half of the number of spokes 12 of the member 11 and are arranged alternately on the spokes 12. Each cable member 50 has a spliced end loop 51 at the free-end while the opposite ends are attached to a common point of the cable bridle 49. For example, as shown in FIG. 1, the common point can be formed by a ring 52, or the members 50 can be knotted together at common ends. Each cable member 50 is intially disposed to lie across the upper surface of an alternate spoke 12 prior to formation of the hank 47 by the feed means 26. Thus, as the rovings 31 are subsequently draped over the spokes 12 of the rotatable member 11, the rovings 31 also drape across the cable member 50.

Referring to FIGS. 3 and 4 after the hank 47 has been formed over the cable members 50 and spokes 12, each roving 31 is cut at the feed means 26. For example, each roving is cut so as to form a tail end of a length equal to one half of a loop. In this way, excess material within the hank can be avoided. The hank 47 is then moved, e.g., manually, towards the center ring 13 of the rotatable member 11. Thereafter, each loop 51 of the cable member 50 is inserted under the adjacent drape 46 by being slid under the spoke 12 so that each cable member 50 is able to lift two loops of the draped hank 47 from the rotatable member 11.

Referring to FIG. 5, the lifting means 48 also includes an electric hoist 53, as is known, having a hoist hook 54. This hoist 53 serves to lift the cable bridle 49 and hank 47. to this end, the loops 51 of the cable bridle 49 are sized so as to be mounted on the hook 54 of the hoist 53.

Referring to FIGS. 1 and 2, the mandrel 19 which is positioned concentrically within the center ring 13 of the rotatable member 11 is secured by a suitable lifting means 55 such as an eyelet to the electric hoist 53. For example, the mandrel 19 has a solid end which is provided with an upstanding eyelet 55 for engaging with the hook 54 of the hoist 53. In this manner, the mandrel 19 can be lifted from the pit 17 at the same time as the hank 47 is lifted from the spoked member 11 (cf. FIGS. 5 and 6).

Referring to FIG. 2, the hank forming machine 10 is mounted below a suitable tape wrapping assembly 56 so that the hank 47 and mandrel 19 can be formed into a suitable package for subsequent curing operations as are known. This assembly 56 includes a member 57 defining an orifice 58 through which the mandrel 19 and hank 47 pass as well as a wrapping head 59. For example, the member 57 is formed of a resilient deformable material, such as rubber, which is mounted in a support ring 60 of the wrapping head 59. In addition, the orifice 58 is circular in cross-section, or of any other suitable cross-section. The orifice 58 of the deformable member 57 is sized so as to compact the resin impregnated hank 47 against the mandrel 19 as mandrel 19 and hank 47 pass therethrough in a manner as is known.

The tape wrapping head 59 includes a plurality of spools 61 which are mounted on the support ring 60 to wind a suitable wrapping, for example, a cellophane tape 62 about the mandrel 19 and hank 47 after passage through the orifice 58.

In use, referring to FIGS. 5 and 6, after the eyelet 55 secured to the mandrel 19 and the cable bridle 49 have been mounted on the hoist hook 54, the hoist 53 lifts the mandrel 19 and hank 47 through the deformable orifice 58 so that the hank 47 is pressed about the circumference of the mandrel 19. As the hank 47 is pulled upward, the loops at the bottom of the draped hank 47 catch on the knife blades 25 and are severed leaving ends of glass fiber strands. Upon passing through the deformable orifice 58, the wrapping head 59 applies two layers of cellophane tape 62 in each direction helically of the hank 47 and mandrel 19 in order to form a package having a generally smooth surface and to protect the resin from being inhibited by air while curing. The bridle 49 is then removed. This can be accomplished in any suitable manner, such as by cutting circumferentially through the roving at the upper end of the mandrel to remove the looped ends of the roving thereat and to permit the bridle to be removed. In the case where the bridle is formed of individual members knotted together, the bridle can be simply removed without disengaging the mandrel from the hoist. The above cutting also serves to facilitate the formation of a finished flat end on the final pole structure. The resultant package is then transported by the electric hoist 53 to a suitable curing oven for curing of the resin and hardening of the package into a self-supporting structure. After curing, the hoist can be employed to move the structure to a disassembly station at which the cellophane can be removed or left in place. The finished structure is then finished for use, e.g., as a pole, antenna, rod or the like depending on the size.

The drapes of the hank 47 can be arranged to produce a structure having a constant thickness of resin impregnated filamentary material along the length of the mandrel 19 of decreasing or increasing thickness in the direction of the small end of the mandrel 19.

Referring to FIG. 8, the mandrel 19 can be of a constant cross-sectional area, for example, of circular cross-section while the hank 47 is formed of drapes having strands of variable lengths. In this case, the hank 47 has a greater cross-sectional area of material at the upper end of the mandrel 19 than at the lower end. As a result, the finished rod has a greater thickness at the upper end than at the lower end. Also, where the mandrel 19 is subsequently removed, the rod has a constant diameter bore.

Referring to FIG. 9 the mandrel 19 can be tapered with the smaller dimensional end at the bottom so that the hank 47 has the section of greater filamentary material at the larger end of the mandrel 19 with the section of smaller material at the smaller end. This will produce a finished structure having a tapered bore with a greater thickness at the large end of the bore than at the small end of the bore. The finished structure can also have a taper from the end of larger thickness to the end of smaller thickness. Alternatively, the hank can be sized so as to effect an outer diameter of constant dimension.

Referring to FIG. 10 wherein like reference characters indicate like parts as above, the rotatable member 11 is connected to a reciprocating drive 70. This reciprocating drive 70 includes a cylinder 71 mounted in a pivotal manner on a suitable support 72 below the rotatable member 11, and a reciprocal piston rod 73 which engages with the depending outer ring 13 of the rotatable member 11 via a slotted link 74. The drive 70 is programmed in a suitable fashion so as to oscillate the rotatable member 11 back and forth over an arcuate period sufficient to pass a spoke by and beneath a feeding means 26, e.g., a period equal to or less than the arcuate spacing between the center lines of two consecutive spokes 12. In operation, each feed means 26 drops a length of roving 31 into a space between two consecutive spokes 12 for a predetermined time. Thereafter, as the reciprocating drive 70 either moves the rotatable member 11 continuously or intermittently so as to move the spokes 12 past the feed points of the rovings 31, the respective flappers 45, as above, engage the rovings 31 against the spokes 12. After another programmed length of time, the drive 70 returns or reverses the rotatable member 11 to return to the intial position. This causes the spokes 12 to move past the feed points of the respective feed means 26 again. In this way, a drape is formed to one side of each spoke 12 under a feed means 26. A second drape is then formed to the other side of each of these spokes 12, in a similar fashion. Thus, each of these spokes 12 serves to hold two drapes of roving 31 thereon. As shown, any number of feed means can be used with the rotatable member 11, e.g., where six feed means 26 are used, only six of the twelve spokes 12 are used at any one time.

A secnd flapper (not shown) may also be mounted on the opposite side of each spoke 12 to hold the roving 31 in place as the next drape is being formed.

As shown, a cable bridle 49 is provided with a cable member 50 disposed over those spokes 12 of the rotatable member 11 on which the roving is to be draped. Each cable member 50 serves to loop under the formed drapes so that each cable member 50 lifts a pair of drapes from the rotatable member 11.

It is noted that the severing means 25 can be omitted in this embodiment as the drapes will not be disposed to pass over the blades 25.

The invention thus provides a hank forming machine which is capable of forming tapered poles and the like structures of relatively great lengths. Further, the hank forming machine utilizes components of relatively small bulk and weight so that bulky equipment is avoided. Also, since the hank forming machine can be supplied with continuous rovings from relatively few supply stations, the need for a large inventory of material is avoided.

It is noted that a tapered pole can be made by the hank forming machine without the need for a mandrel where the pole is to be of solid construction. In this case, the drapes of the hank provide for the necessary taper in the finished pole and the deformable orifice is provided with an orifice opening of suitable size to effect compaction of the hank as the hank is drawn through the orifice prior to wrapping with tape.

It is also noted that the mandrel can be removed from the cured structure or can remain in place. In the latter case, the mandrel can be made of any suitable material to impart determined characteristics to the finished structure. For example, the mandrel can be made of metal or wood material so as to impart additional strength, or can be made of a foamed material so as to impart bouyancy. Further, a hollow mandrel can be utilized which can be subsequently removed, or retained in place and filled with a suitable material.

Further, the mandrel can be provided with a layer of spirally wound resin impregnated glass fiber filaments, rovings or braid before application of the longitudinal rovings. In this way, the final pole structure will possess an inner layer of spirally wound filaments and an outer layer of longitudinal filaments. This pole structure, depending on size, type of resin, and the like can have rigid or flexible characteristics so as to adapt to different uses such as to use as a fishing rod. The spirally wound layer can be held in place on the mandrel by the use of a suitable waxy mold release, especially if the filaments are applied in the dry state, or by means of the resin and the tension of the applied filaments. It is also noted that any suitable winding of the filaments can be used, e.g., by winding of filaments in opposite directions, and by winding in a braid or an interwoven braid.

Further, a wrap of glass fiber roving or the like can be applied to the outside of the pole by using at least one extra spool mounted on the tape wrapping head and using the spool to apply a helical layer of roving in addition to the tape.

It is noted that the variation in speed of the rotatable member provides two functions. In one case, the lengths of strands for the respective loops of the hank are controlled and, in the second case, the production of a tube having a series of shorter length strands at the large end plus a number of other strands that get progressively longer until a series of full length strands are made up is permitted. This provides a larger cross-sectional area of the tube and a decreasing wall section area as it proceeds to the smaller end of the tube. The speed can also be varied so that the wall thickness is constant from end to end. In this case, the area and, consequently, the number of strands can be reduced because the outside and inside diameters are reduced.

It is noted that the rate of speed reduction need not be uniform but can also vary in a curvilinear manner.

Also, it is noted that the pit which is located below the rotatable member is of sufficient depth to permit mounting of the mandrel therein. This allows the entire operation from forming of the hank to the forming of the package from the hank and mandrel to be carried out in a vertical plane.

The pole structure which is formed by the invention can be of any suitable length, for example, for use, as a telephone pole, transmission pole, sailing mast, flag pole, street lighting pole and the like. For example, the poles can be in excess of 40 feet in length.

What is claimed is:

1. In a hank forming machine, the combination comprising
   a rotatable member having a plurality of spokes therein;
   at least one feed means for feeding a continuous length of roving onto said member;
   means for moving said member relative to said feed means to direct a fed length of roving to drape over at least one of said spokes; and
   means for retaining a length of roving draped over said one spoke on said one spoke.

2. In a hank forming machine, the combination comprising
   a rotatable member having a plurality of spokes therein;
   at least one feed means for feeding a continuous length of roving onto said member;
   means for moving said member relative to said feed machine to direct a fed length of roving to drape over at least one of said spokes;
   means for retaining a length of roving draped over said one spoke on said one spoke; and
   means for lifting the length of roving from said one spoke.

3. In a hank forming machine as set forth in claim 2, the combination which further comprises means defining a deformable orifice for pulling of the draped length or roving on said lifting means therethrough for radial compression of the roving therein.

4. In a hank forming machine as set forth in claim 3, the combination which further comprises a mandrel and means for moving said mandrel through said orifice simultaneously with the roving whereby the roving is pressed against said mandrel.

5. In a hank forming machine as set forth in claim 4, the combination which further comprises a wrapping head downstream of said orifice for wrapping at least one wrapper about the roving and said mandrel.

6. In a hank forming machine as set forth in claim 1, wherein said means for moving said member imparts an oscillating motion to said member.

7. In a hank forming machine as set forth in claim 6 which further comprises a plurality of feed means and wherein each feed means is disposed adjacent a respective one of said spokes to drape a length of roving over said respective spoke.

8. In a hank forming machine as set forth in claim 7, the combination which further comprises a lifting means having a plurality of cables extending from a common point thereof, each said cable being disposed between a respective spoke and a roving draped thereon and having a loop at one end thereof for securement to said common point to encompass the roving on said respective spoke.

9. In a hank forming machine as set forth in claim 1 wherein said means for moving said member imparts a rotary motion to said member.

10. In a hank forming machine as set forth in claim 1 wherein said means for moving said member imparts a variable speed to said member whereby the roving is draped between consecutive spokes in successive drapes of different length.

11. In a hank forming machine as set forth in claim 10, the combination which further comprises means for lifting the drapes of roving from said spokes and means between said spokes for severing the drapes of roving at the lower end thereof.

12. In a hank forming machine as set forth in claim 11, the combination wherein said member includes a central ring defining an opening and wherein said spokes radiate from said ring, which further comprises a mandrel for passing upwardly through said opening in said ring simultaneously with lifting of the drapes of roving from said spokes whereby the drapes of roving are circumferentially positioned about said mandrel.

13. The combination of
   a rotatable member having a plurality of spokes therein;
   at least one feed means positioned adjacent said member for feeding a roving onto said member between said spokes;
   means for moving said member relative to said feed means to cause the roving to drape over said spokes;
   a mandrel positioned centrally of said member; and
   means for lifting the draped roving from said spokes to dispose the roving circumferentially about said mandrel.

14. The combination as set forth in claim 13 wherein said mandrel is tapered.

15. The combination as set forth in claim 13 wherein said means for moving said member imparts a variable speed to said member to vary the length of drape of the roving between said spokes.

16. The combination as set forth in claim 15 which further comprises means for lifting said mandrel simultaneously with the draped roving disposed thereabout; and a tape wrapping head mechanism including an orifice for passing of said mandrel and roving therethrough, said orifice being sized to press the roving against said mandrel, and a head for wrapping at least one layer of wrapping about the pressed together roving and mandrel.

17. The combination as set forth in claim 13 which further includes means for severing the drapes of roving between each pair of consecutive spokes.

18. The combination as set forth in claim 17 wherein said means for severing is a knife blade mounted on said member in radiating manner.

19. The combination as set forth in claim 13 which further includes mounting means rotatably supporting the outer periphery of said member, and wherein said means for moving said member is drivingly connected to said outer periphery of said member.

20. The combination as set forth in claim 13 wherein said feed means is a capstan type roving feed device having at least one roving package supply means, a resin impregnating tank, and a capstan drive.

21. The combination as set forth in claim 20 wherein said capstan drive includes a delivery roll for delivering the roving towards said member and a wiper blade adjacent said roll for shaving the roving from said roll into a space between a pair of spokes of said member.

22. The combination as set forth in claim 13 which further comprises at least one resilient flapper mounted over said member and projecting into the plane of said spokes, said flapper being positioned in spaced relation adjacent a respective feed means whereby upon movement of said member relative to said feed means said flapper engages the roving fed into said member between a pair of said spokes and retains the roving against one of said spokes to prevent slipping of the roving relative to said one spoke.

23. The combination as set forth in claim 13 wherein said means for moving said member imparts a rotary motion thereto.

24. In a hank forming machine, the combination comprising
- a rotatable member having a plurality of spokes therein;
- at least one feed means for feeding a continuous length of roving onto said member;
- means for moving said member relative to said feed means to direct a fed length of roving to drape over at least one of said spokes; and
- means for lifting the length of roving from said one spoke.

25. In a hank forming machine, the combination comprising
- a rotatable member having a plurality of spokes therein;
- at least one feed means for feeding a continuous length of roving onto said member; and
- means for moving said member relative to said feed means to direct a fed length of roving to drape over at least one of said spokes, said means imparting an oscillating motion to said member.

* * * * *